US006694230B2

(12) United States Patent
Kubica

(10) Patent No.: US 6,694,230 B2
(45) Date of Patent: Feb. 17, 2004

(54) AIRCRAFT WITH ELECTRICAL FLY-BY-WIRE CONTROLS, EQUIPPED WITH AN AUTOMATIC PILOT

(75) Inventor: François Kubica, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 09/863,894

(22) Filed: May 24, 2001

(65) Prior Publication Data

US 2002/0002428 A1 Jan. 3, 2002

(30) Foreign Application Priority Data

May 29, 2000 (FR) .......................................... 00 06828

(51) Int. Cl.[7] .............................................. B64C 19/00
(52) U.S. Cl. ....................................... 701/11; 244/76 R
(58) Field of Search ..................... 701/1, 3–9, 11–12, 701/15–16, 23–25; 244/3.15, 158, 4 R, 6, 75 R, 76 R, 175–178, 180–186, 196–197, 220–225, 234–237

(56) References Cited

U.S. PATENT DOCUMENTS

| | | | | |
|---|---|---|---|---|
| 4,748,392 A | * | 5/1988 | Goicoechea | ................. 318/611 |
| 5,197,697 A | | 3/1993 | Lyloc et al. | |
| 5,428,543 A | * | 6/1995 | Gold et al. | ..................... 701/5 |
| 5,714,948 A | * | 2/1998 | Farmakis et al. | ........... 340/961 |
| 6,276,640 B1 | * | 8/2001 | Laffisse et al. | ............. 244/178 |

FOREIGN PATENT DOCUMENTS

EP      0573106      12/1993

OTHER PUBLICATIONS

FR Search Report dated Feb. 8, 2001.

* cited by examiner

Primary Examiner—Thu V. Nguyen
(74) Attorney, Agent, or Firm—Stevens, Davis, Miller & Mosher, LLP

(57) ABSTRACT

An aircraft with electrical fly-by-wire controls is equipped with an automatic pilot having a navigation computer producing automatic pilot instructions that are sent directly to a flight control computer. The flight control computer produces commands for operating the automatic pilot in respect of the actuators for control surfaces on the aircraft.

3 Claims, 2 Drawing Sheets

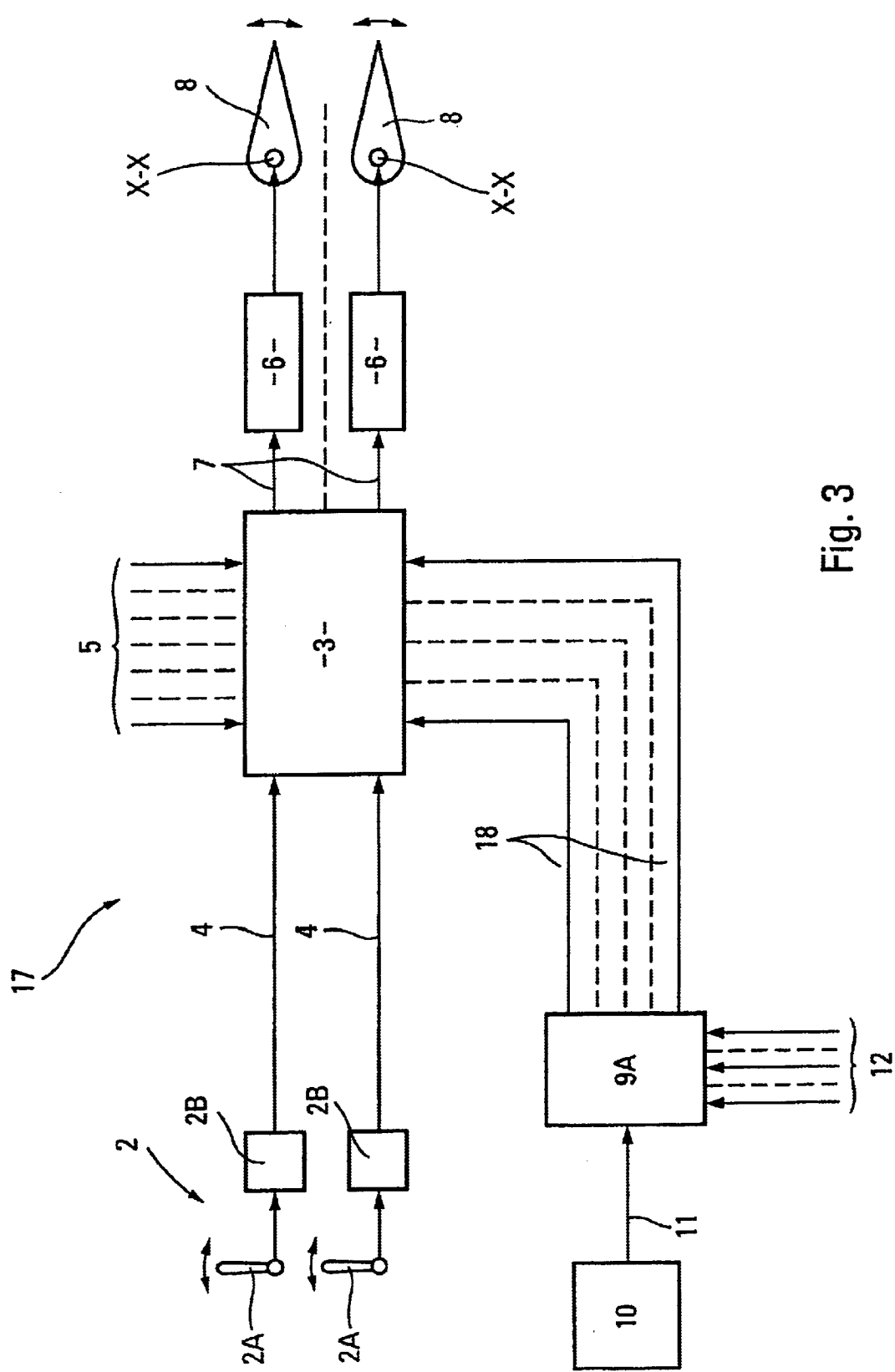

AIRCRAFT WITH ELECTRICAL FLY-BY-WIRE CONTROLS, EQUIPPED WITH AN AUTOMATIC PILOT

The present invention relates to aircraft with electrical fly-by-wire controls and, more particularly, to the architecture of the flight control system for such aircraft.

BACKGROUND OF THE INVENTION

It is known that an aircraft with electrical fly-by-wire controls has controls, such as sticks, ministicks, rudder bars, etc., equipped with electrical transducers so that they generate electrical control instructions which represent the action that a pilot exerts on them. It also comprises a computer of flight control commands which, on the basis of said electrical control instructions generated by said controls and of control parameters originating, for example, from sensors, produces electrical operating commands that said flight control computer applies to actuators tasked with moving the control surfaces of the aircraft.

It is also commonplace for such an aircraft to have an automatic pilot capable, under certain circumstances, of piloting said aircraft in place of the pilot. As is also known, an automatic pilot consists essentially of a navigation computer and of a control computer. The navigation computer receives guidance instructions (indicated to it by the pilot) and guidance parameters (sent to it by sensors or by an inertial unit, for example), and from these guidance instructions and parameters produces automatic pilot instructions. For its part, the control computer converts these automatic pilot instructions into commands for operating the automatic pilot, which it applies to said actuators of the control surfaces of the aircraft.

Depending on the known embodiments of automatic pilots, said commands for operating the automatic pilot are applied to said actuators either directly or via said flight control computer. In the latter case, it will be noted that said flight control computer receives, from the automatic pilot, said commands for operating the automatic pilot which have already been fully produced and that in consequence its role amounts simply to transmitting said automatic pilot control commands unmodified.

Whichever of these two embodiments is on board the aircraft, it must also, however, be pointed out that, in such a known architecture, it is necessary to provide two control functions, namely one for the flight control computer and the other for the automatic pilot. Aside from the fact that this gives rise to significant costs, it may happen, owing to constraints of the system, that said control functions differ, particularly as regards the calculation power, the acquisition of parameters, the monitoring, etc. It is therefore compulsory to develop and to validate two control functions. In addition, a structure such as this does not make it possible to minimize the delays between the inertial information and the operating commands given by the automatic pilot to the control surfaces.

BRIEF SUMMARY OF THE INVENTION

An object of the present invention is to overcome these drawbacks.

To this end, according to the invention, the aircraft with electrical fly-by-wire controls, equipped with control surfaces capable of being moved by electrically operated actuators, said aircraft comprising:

controls and a flight control computer, said controls being actuated by a pilot and generating electrical control instructions which are sent to said flight control computer, the latter computer generating, from said electrical control instructions and from control parameters, operating commands sent to said actuators to move said control surfaces; and an automatic pilot capable of piloting said aircraft in place of said pilot and exerting a navigation function making it possible to produce automatic pilot instructions from the guidance instructions and guidance parameters sent to it, and a control function which consists in producing, from said automatic pilot instructions, automatic pilot operating commands sent to said actuators to move said control surfaces, is noteworthy:

in that said automatic pilot consists exclusively of calculation means producing said automatic pilot instructions from said guidance instructions and said guidance parameters;

in that said calculation means are connected directly to said flight control computer so as to send said automatic pilot instructions to the latter; and in that said flight control computer, from said automatic pilot instructions, produces said automatic pilot operating commands and sends these commands to said actuators to cause them to move said control surfaces accordingly.

Thus, according to the present invention, the control computer of said automatic pilot is eliminated and it is the flight control computer which fulfils the control function of the automatic pilot. The invention therefore makes it possible to develop and validate just one control function, the latter being embedded in said flight control computer. In addition it makes it possible to minimize the delay between the inertial information and the commands issued to the control surfaces by the automatic pilot. Furthermore, it also offers the possibility of making the responses of the aircraft under manual piloting consistent with those with the automatic pilot in operation.

As a preference, in order to simplify the structure of said flight control computer as far as possible, said electrical control instructions from said controls and said automatic pilot instructions from said calculation means of the automatic pilot are, by pairs, of the same nature. For example:

said calculation means of the automatic pilot produce, from said guidance instructions and said guidance parameters, three automatic pilot instructions which correspond respectively to a commanded vertical load factor, to a commanded roll rate and to a commanded yaw; and said controls generate three electrical control instructions which are respectively consistent with a commanded vertical load factor, with a commanded roll rate and with a commanded yaw.

BRIEF DESCRIPTION OF THE SEVERAL VIEWS OF THE DRAWINGS

The figures of the appended drawing will make it easy to understand how the invention may be embodied. In these figures, identical references denote elements which are similar.

FIG. 3 schematically illustrates the architecture of the electrical fly-by-wire system according to the present invention.

DETAILED DESCRIPTION OF THE INVENTION

Figure 1:
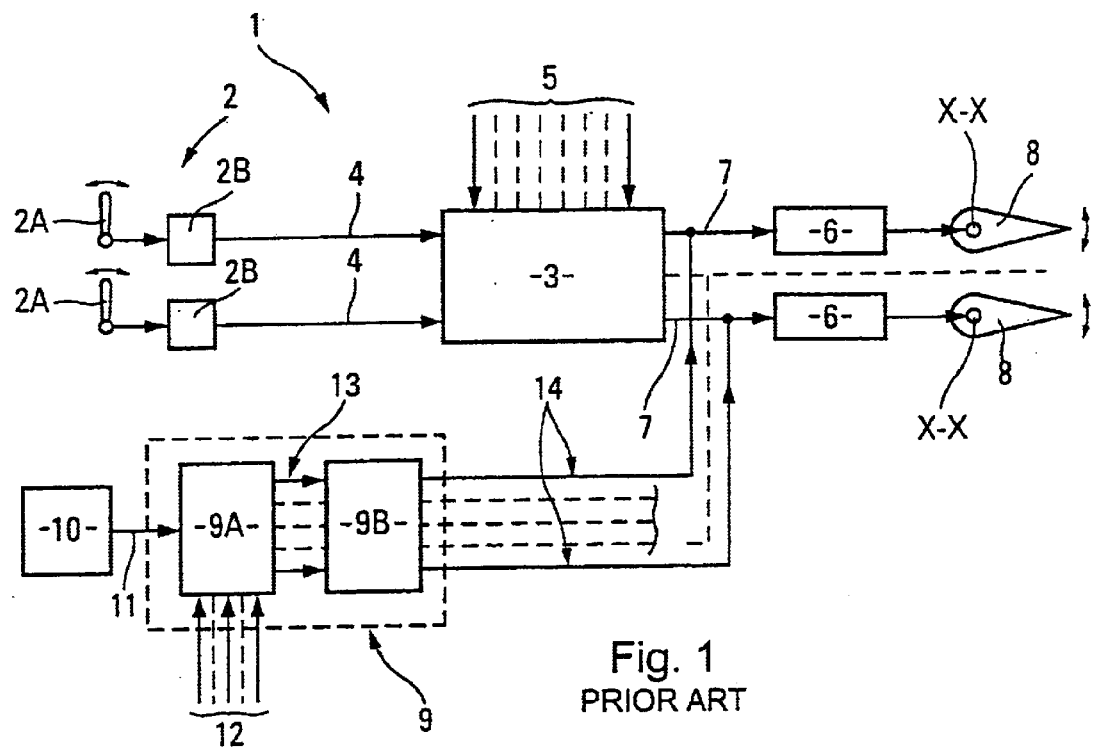
FIGS. 1 and 2 schematically illustrate two known architectures of an aircraft electrical fly-by-wire system.

The known architecture 1 of an electrical fly-by-wire system for an aircraft (not depicted) essentially comprises:

controls 2 comprising elements 2A such as ministicks, rudder bars, etc., intended to be actuated by a pilot (not depicted) and associated with transducers 2B generating electrical control instructions representative of the movements of said elements 2A;

a flight control computer 3 which, in the usual way, via links 4, receives said electrical control instructions generated by the controls 2, and via links 5 receives control parameters from sensors, other computers, etc. and which, from said electrical control instructions and said control parameters, generates operating commands;

actuators 6 which receive said operating commands via links 7 and which move the control surfaces 8 of said aircraft accordingly, for example in rotation about axes X—X;

an automatic pilot 9 comprising a navigation computer 9A and a control computer 9B. The navigation computer 9A receives, from a device 10, guidance instructions which are put up by said pilot and transmitted thereto by links 11. It also receives guidance parameters sent to it from the sensors, other computers, etc. by lines 12. From said guidance instructions and said guidance parameters, the navigation computer 9A produces automatic pilot instructions which it sends to the control computer 9B via links 13. The control computer 9B, from these automatic pilot instructions, produces commands for operating the automatic pilot, which it sends to the actuators 6, via links 14, so as to move said control surfaces 8.

Figure 2:
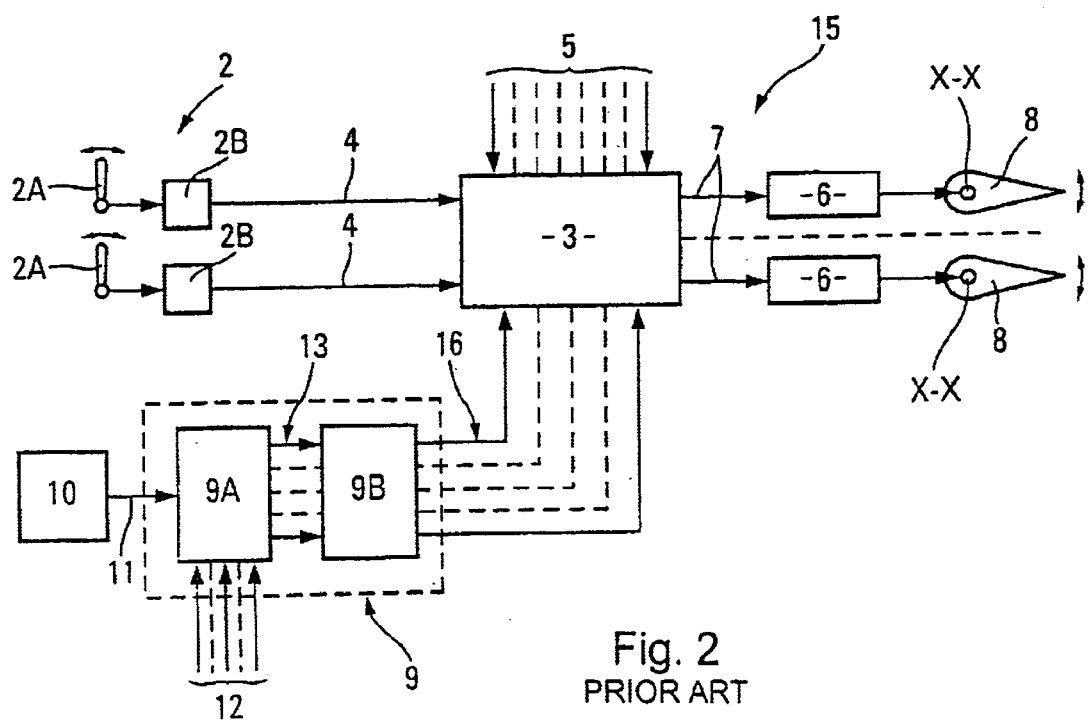

In an alternative form of embodiment 15, which is also known and shown in FIG. 2, all of the elements 2 to 13 described with reference to FIG. 1 can again be seen. The only difference compared with the architecture of the latter figure lies in the fact that the commands for operating the automatic pilot, produced by the control computer 9B, instead of being sent directly to the actuators 6 via the links 14, are sent there indirectly via the flight control computer 3. What actually happens is that links 16 connect the outputs of the control computer 9B to said flight control computer 3. Thus, the latter receives, from the control computer 9B, the commands for operating the automatic pilot which have been fully produced, and transmits them, without modifying them, to said actuators 6, via the links 7. The transmission through the flight control computer 3 is passive, and is equivalent to that performed by the lines 14 in FIG. 1.

The architecture 17 according to the present invention and illustrated schematically in FIG. 3 comprises all the elements 2 to 8 and 10 to 12 described hereinabove. By contrast, the control computer 9B and the associated links 13, 14, 16 have been omitted.

In the architecture 17, the automatic pilot instructions produced by the navigation computer 9A are sent directly to the flight control computer 3 by links 18. From these automatic pilot instructions, said flight control computer 3, in a similar way to what occurs with the electrical control instructions from the controls 2, produces commands for operating the automatic pilot, which it sends to the actuators 6 via the links 7.

From guidance (heading, vertical speed, altitude, etc.) instructions sent to it by the device 10, the navigation computer 9A calculates three automatic pilot instructions, namely a commanded vertical load factor, a commanded roll rate and a commanded yaw. The latter instructions are sent, via the links 18, to the flight control computer 3 which produces the automatic turning commands for the control surfaces 8 (elevator, stabilizer, ailerons, rudder, etc.).

Moreover, the controls 2 (sticks, rudder bars, etc.) produce control instructions which are respectively consistent with a commanded vertical load factor, a commanded roll rate and a commanded yaw. These control instructions are also sent to said flight control computer 3, which produces the turn commands for said control surfaces 8.

What is claimed is:

1. An aircraft with electrical fly-by-wire controls, equipped with control surfaces capable of being moved by electrically operated actuators, said aircraft comprising:

controls which are actuated by a pilot and generate electrical control instructions which are sent to a flight control computer;

an automatic pilot operable to pilot said aircraft in place of the pilot, and consisting exclusively of calculation means producing automatic pilot instructions from guidance instructions, of at least heading, vertical speed and altitude, which are put up by the pilot, and from guidance parameters sent to it, wherein said calculation means is connected directly by links to said flight control computer so as to send said automatic pilot instructions to said flight control computer; and said flight control computer including one control function which produces, either from said electrical control instructions received from said controls and from control parameters or from said automatic pilot instructions received from said calculation means, operating commands and said flight control computer sending these operating commands to said actuators to cause them to move said control surfaces correspondingly.

2. The aircraft as claimed in claim 1, wherein said electrical control instructions from said controls and said automatic pilot instructions from said calculation means of the automatic pilot are, by pairs, of the same nature.

3. The aircraft as claimed in claim 2, wherein:

said calculation means of the automatic pilot produce, from said guidance instructions and said guidance parameters, three automatic pilot instructions which correspond respectively to a commanded vertical load factor, to a commanded roll rate and to a commanded yaw; and said controls generate three electrical control instructions which are respectively consistent with a commanded vertical load factor, with a commanded roll rate and with a commanded yaw.

* * * * *